United States Patent

Klein

[15] 3,647,224

[45] Mar. 7, 1972

[54] VISCOUS DAMPED PIVOT SYSTEM FOR A PHONOGRAPH TONE ARM

[72] Inventor: Keith W. Klein, Simsbury, Conn.

[73] Assignee: General Electric Company

[22] Filed: Feb. 8, 1970

[21] Appl. No.: 1,403

[52] U.S. Cl. ....................274/23 R
[51] Int. Cl. ....................G11b 3/10
[58] Field of Search ....................274/23

[56] References Cited

UNITED STATES PATENTS 2,551,506 5/1951 Rockwell ....................274/23
2,676,806 4/1954 Bachman ....................274/23

*Primary Examiner*—Harry N. Haroian
*Attorney*—W. Joseph Shanley, Frank L. Neuhauser, Oscar B. Waddell, Joseph B. Forman and Stanley C. Corwin

[57] ABSTRACT

A pivotal supporting arrangement for a phonograph tone arm is provided. This arrangement incorporates a stator having a channel therein for receiving a viscous damping fluid. The stator is structured to pivotally support a phonograph tone arm. A drag disc having a pickup tab formed on it is coaxially disposed relative to the stator and slidably engages the damping fluid in the stator channel. With this approach, an actuating portion of the tone arm housing acts upon the pickup tab of the drag disc during movement of the tone arm about its horizontal axis, with the disc sliding on the damping fluid to provide lost motion or time delay between the tone arm and the stator. The stator also pivotally supports the tone arm for movement about a horizontal axis. A control spring is attached to the drag disc to enable the operator to select the desired amount of drag for exertion upon the tone arm. A stop tab on the stator is also provided for limiting movement of the drag disc with respect to the stator during vertical movement of the free end of the tone arm toward the turntable. The physical relationship of the actuating portion of the tone arm housing and the pickup tab of the drag disc is such that the viscous damping system is operationally disconnected from the tone arm when the stylus of the tone arm is in contact with a record surface.

10 Claims, 8 Drawing Figures

INVENTOR.
KEITH W. KLEIN.
BY. Thomas A. Brody
HIS ATTORNEY.

INVENTOR.
KEITH W. KLEIN.
BY. Thomas A. Briody
HIS ATTORNEY.

VISCOUS DAMPED PIVOT SYSTEM FOR A PHONOGRAPH TONE ARM

BACKGROUND OF THE INVENTION

This invention relates to a viscous damped pivotal supporting arrangement for a phonograph tone arm, and more particularly to a viscous damped pivot system for a phonograph tone arm which pivots about a vertical axis and a horizontal axis.

The usual types of viscous damped tone arm heretofore known have provided the highly desirable feature of preventing stylus damage or record damage in the event that the free end of the tone arm is dropped or otherwise mishandled. However, these prior art approaches have inherently involved excessive loading or unloading of the stylus in the vertical direction whenever the stylus is placed upon a record.

An important object of the present invention is to provide a damping system for a pivotally supported tone arm, which is operationally disconnected from the tone arm upon engagement of the stylus with the record surface.

A further object of the present invention is to provide a new and improved phonograph which includes a viscous damping mechanism for pivotally supporting a tone arm.

Another object of the present invention is to provide a viscous damped pivot system for a phonograph tone arm, which includes a reliable disconnecting means that permits the arm to rotate freely in a vertical direction through an arc of considerable size when the stylus of the tone arm is in its record playing position.

SUMMARY OF THE INVENTION

In accordance with my invention, in one form thereof, there is provided a tone arm which is pivotally supported for movement about a horizontal axis by connecting the supported end of the tone arm via pivots to a disclike stator. In addition to providing pivotal supports for movement of the tone arm about its horizontal axis, the stator also includes an annular channel on one of its faces, a depending shaft, and a stop tab. The annular channel receives a viscous damping fluid and the shaft engages a stationary bearing to facilitate rotational support for the stator to move about a vertical axis. A drag disc having a pickup tab is coaxially disposed relative to the stator and retained thereto so that it slidably engages the viscous damping fluid in the stator channel. A control spring is attached to the drag disc and the stator to enable the operator to select the desired amount of drag for exertion upon the tone arm. With this arrangement, an actuating surface at the supported end of the tone arm is engageable with the drag disc pickup tab. The drag disc slides against the viscous damping fluid to provide a time delay mechanism during movement of the tone arm between its uppermost and record engaging positions. Whenever the tone arm reaches the record, the stylus thereof impinges upon the record to stop any further movement of the tone arm in a downward direction. The spring continues to act upon the drag disc until such time as a portion thereof engages the stop tab of the stator. This continual movement of the disc after the tone arm contacts a record serves to disengage the pickup tab of the drag disc from the tone arm so that when a record is being played the viscous damping system is operationally disconnected from the tone arm.

Further aspects of my invention will become apparent hereinafter, and the specification concludes with claims particularly pointing out and distinctly claiming the subject matter which I regard as my invention. The invention itself, however, both as to organization and method of operation, as well as additional objects and advantages thereof, will best be understood from the following description, when read in conjunction with the accompanying drawings.

DESCRIPTION OF PREFERRED EMBODIMENT

Figure 1:
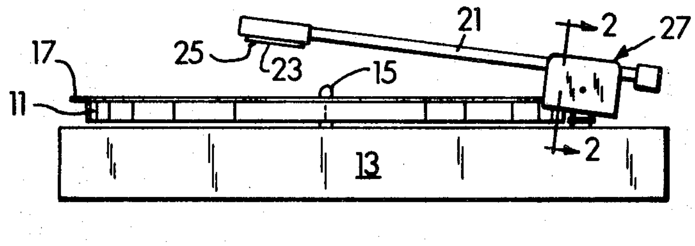
FIG. 1 is a side elevation view of a phonograph record player in which one form of my viscous damped pivot system may be employed.

Referring first to FIG. 1, there is shown a phonograph record player 1 which includes a rotatable turntable 11 driven by a mechanism (not shown) located within a supporting deck 13. The turntable 11 includes a relatively short spindle 15 which projects upwardly to receive the center aperture of disc-shaped records, such as the record 17 located on the top surface of turntable 11. At the right side of supporting deck 13 near its top (viewing FIG. 1) there is located a tubular support 19 which extends upwardly from the top of deck 13 to rotatably support the tone arm 21 for pivotal movement about a vertical axis.

Figures 2, 2A, 3:
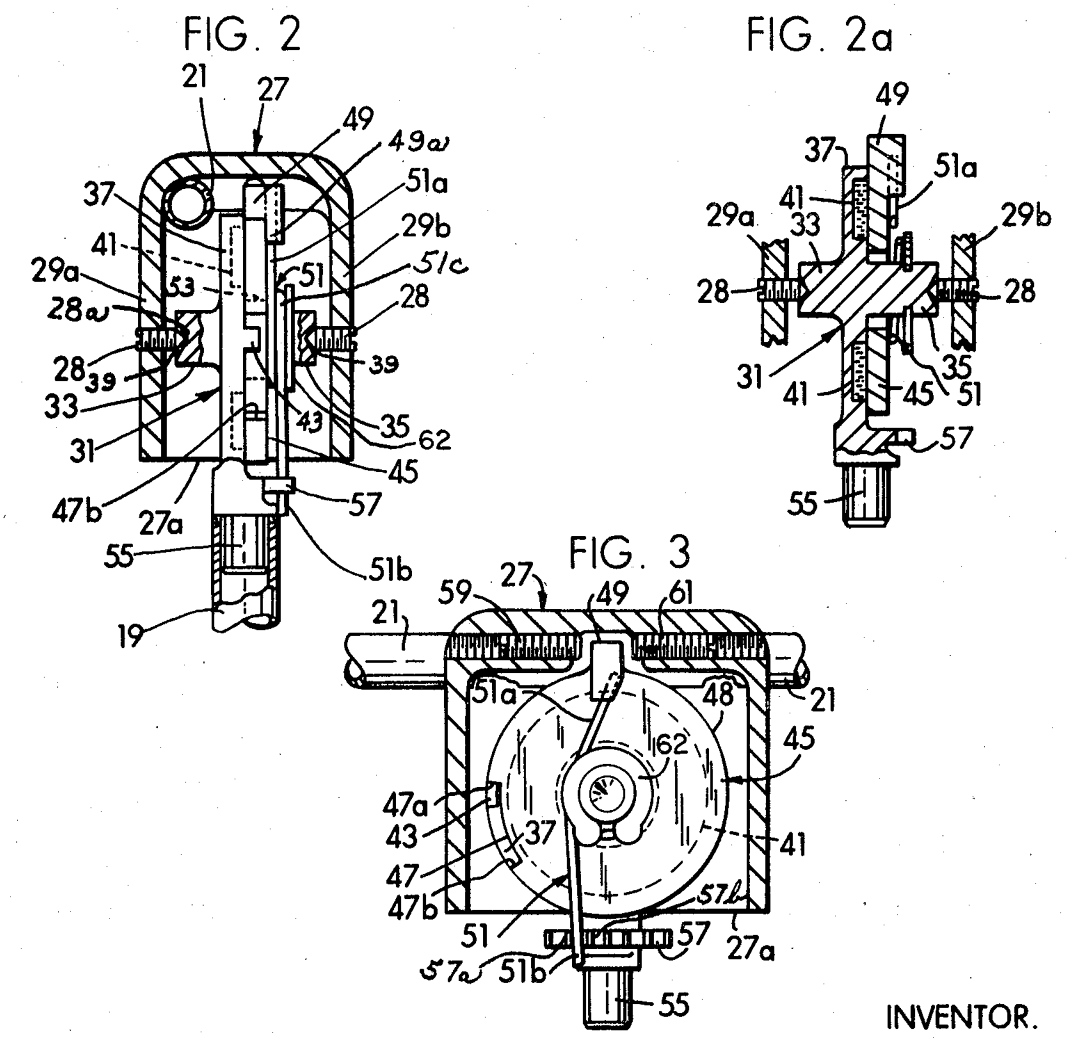
FIG. 2 is a view partially in section and partially broken away, taken generally along the lines 2—2 of FIG. 1, to show the mechanism of the viscous damped pivot system.
FIG. 2*a* is a fragmentary sectional view similar to FIG. 2, with the tone arm housing removed.
FIG. 3 is a view similar to FIG. 2, but taken as a side elevation of the viscous damping mechanism for supporting the tone arm, when the stylus of the tone arm is in playing engagement with a record.

The tone arm 21 is constructed so that it includes a conventional pickup cartridge 23 at its free end. The cartridge 23 includes a stylus 25. The supported end of the tone arm 21 has secured to or integral therewith, a generally rectangular cup-shaped housing 27. (See FIG. 2.) Housing 27 is inverted so that its open end 27*a* faces downwardly, as shown in FIGS. 2 and 3. A pair of pivot studs 28 are threaded into engagement with opposed sides 29*a* and 29*b* of the housing 27. The studs 28 each include a conically configured inner end 28*a*, the purpose of which will be set forth hereinafter.

For economically and efficiently supporting rotative movement of the tone arm 21 about a horizontal axis and a vertical axis, I have provided a generally disc-shaped stator 31. The stator 31 includes a pair of hubs 33 and 35. (See FIG. 2.) The hub 33, which is shorter than hub 35, extends outwardly from one side (the left side, viewing FIG. 2) of disc portion 37 of the stator, and it includes a conically configured recess 39 formed therein to receive the conically configured inner end of one of the pivot studs 28. The side of stator 31 from which hub 33 extends outwardly, has an otherwise generally smooth surface. Hub 35 extends outwardly from the other or right side of stator 31 (viewing FIG. 2), and it also includes a conically configured recess 39 for pivotally supporting the conical inner end of the other pivot stud 28. The side of disc portion 37 facing in an opposite direction to the hub 33 (i.e., to the right, viewing FIG. 2) has an annular channel 41 formed therein. Channel 41, as shown by the dotted lines of FIGS. 3–7, is for receiving a viscous damping fluid, such as a silicon oil, which as will be understood hereinafter, forms an important part of the viscous damped pivot system for my tone arm. In addition to the annular channel 41 for receiving the viscous damping fluid, the right side (FIG. 2) of portion 37 of the stator 31, also includes a stop tab 43 which projects perpendicularly outwardly and away from the side, in a direction parallel to the axis of the hubs 33 and 35. Stop tab 43 helps to limit rotative movement of a drag disc 45 which forms the effective lost motion mechanism of my viscous damped pivot system.

Drag disc 45 is constructed so that it includes a generally flat configuration on both sides thereof, except for a cutaway portion 47 of its periphery 48 and a pickup tab 49 which extends radially outwardly from the main periphery of the disc.

In addition to pickup tab 49 extending radially outwardly from the drag disc 45, as best shown in FIG. 2, it also includes a lateral extension 49*a* (i.e., parallel to the axis of rotation of the disc). Extension 49*a* includes a suitable slot (not shown) for securing one end 51*a* of a motor spring 51 thereto. The drag disc 45 has a hole 53 formed in the center thereof which is suitably larger than the external diameter of the longer hub 35 of stator 31 so that the drag disc 45 may be fitted onto the hub, as shown in FIG. 2. When the drag disc is so positioned into cooperation with hub 35 of stator 31, it will be noted that stop tab 43 of the stator 31 is disposed within the cutaway portion 47 of the drag disc so that the stop tab 43 may engage the shoulders 47*a* and 47*b* at opposite ends of the cutaway portion 47 to limit the relative rotation of the drag disc 45 with respect to stator 31.

It will be further noted that at the base of stator 31, there is formed integrally thereto a cylindrical shaft portion 55. The shaft portion 55 depends downwardly from disc portion 37 of the stator 31, and is rotatably received within the aforementioned tubular support 19, so that the stator may rotate about a vertical axis, upon the supporting deck 13.

For appropriately adjusting the amount of biasing force which spring 51 may exert upon the drag disc 45 to implement relative movement of the disc 45 with respect to the stator 31, a graduated spring anchor sector 57 is secured to the stator 31 between disc portion 37 (FIG. 2) and shaft portion 55 (FIG. 3). The graduated spring anchor sector 57 may form an integral part of the stator 31, such as, for example, by being molded thereto.

After being connected at one of its ends 51*a* to the inwardly extending face 49*a* of pickup tab 49, as shown in FIG. 3, the spring 51 is wrapped around the hub 35, as shown in FIG. 2, to form a plurality of coils 51*c*. The other end 51*b* of spring 51 is placed between a pair of ribs formed in the sector 57, such as ribs 57*a* and 57*b*, shown in FIG. 3. The spring 51, thus tends continuously to bias the drag disc 45 with respect to the stator 31, in a counterclockwise direction with respect thereto (viewing FIG. 3).

A collar 62, shown in FIGS. 2 and 3, is fitted about a notched portion of hub 35 and held in place thereon by spring tension. Collar 62 exerts a force against the coils of spring 51 so as to urge drag element 45 into continuous frictional engagement with the viscous damping fluid in channel 41 of bearing element 31. For clarity of illustration, the collar is omitted from the showings in FIGS. 4–7.

For adjusting the amount of free rotation of the tone arm 21, about its horizontal axis and with respect to the turntable 11, in the upper portion of the cup-shaped housing 27 there are placed a pair of opposed adjusting screws 59 and 61 (FIG. 3). The screw 59 is in threaded engagement with a recessed area of the front wall of housing 27, and the screw 61 is in threaded engagement with a recessed portion of the rear wall of housing 27. The inner ends of the screws 59 and 61, which are adjustably positioned by the operator of the device, provide a gap within which there are disposed the opposite sides of the operating portion of pickup tab 49 of the drag disc. Thus, viewing FIG. 3, during movement of the free end of the tone arm 21 from its raised position (FIG. 5) toward the turntable, the inner end of screw 61 tends to contact one adjacent surface of the pickup tab 49, as shown in FIG. 6. During pivotal movement of the tone arm 21 upwardly and away from the turntable, the inner end of adjusting screw 59 tends to contact the other adjacent surface of the pickup tab 49, as shown in FIG. 4.

Turning now to an explanation of the operation of the improved viscous damping mechanism which I have provided for pivotally supporting the tone arm 21, attention is initially directed to FIGS. 1 and 3. As shown therein, when the stylus 25 of tone arm 21 is in engagement with record 17 (FIG. 1), the pickup tab 49 is located between and spaced apart from each of the inner ends of the adjusting screws 59 and 61 of the tone arm housing 27. For such condition, the viscous damping mechanism has no effect upon the operation of the tone arm and the stylus 25 interacts with the grooves of the record 17 with no pressure or drag being exerted upon the tone arm 21*a* by the viscous damping mechanism. For this condition, it should be further noted that the upper shoulder 47*a* of cutaway peripheral portion 47 of the drag disc 45, engages the stop tab 43. The disc 45 is normally maintained in this position relative to the stator 31 by means of the counterclockwise biasing force exerted upon the drag disc 45 by the motor spring 51.

Figure 4:
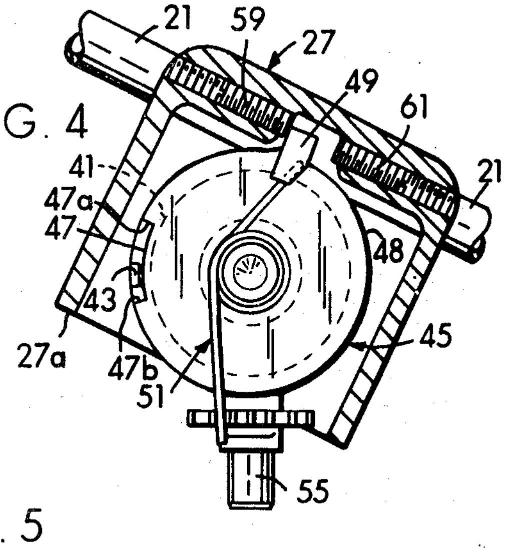
FIG. 4 is a view similar to FIG. 3, showing the tone arm when its free end is being raised from its record playing position upwardly from the turntable.

When the free end of the tone arm is raised by the operator from the turntable, as indicated best in FIG. 4, the inner end of adjusting screw 59 of the tone arm housing 27, thereupon engages the adjacent surface of the pickup tab 49 of the drag disc 45, to rotate the drag disc about a horizontal axis relative to the stator 31. The upper shoulder 47*a* of the cutaway portion 47 of the disc 45, thereupon rotates in a clockwise direction away from stop tab 43, to the position wherein it is shown in exemplary fashion in FIG. 4. Spring 51 is thereupon loaded for the purpose of eventually providing a biasing force to operate the drag disc back in a counterclockwise direction relative to the stator.

Figure 5:
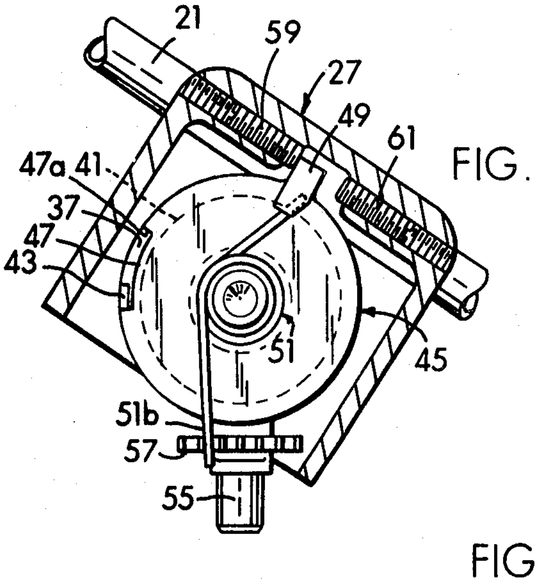
FIG. 5 is a view similar to FIG. 3, showing the tone arm when its free end has been elevated to its maximum extent.
Figure 6:
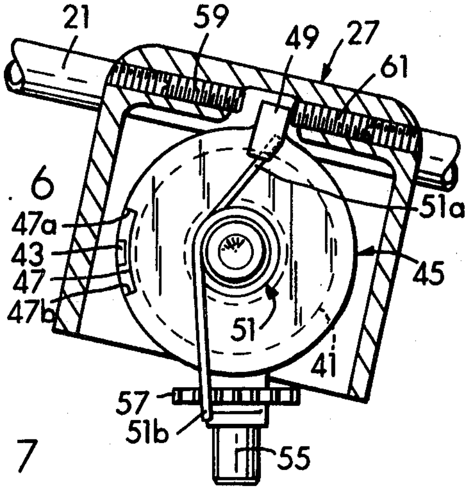
FIG. 6 is a view similar to FIG. 3 showing the tone arm when its free end is being dropped from its maximum elevated position, toward the turntable.
Figure 7:
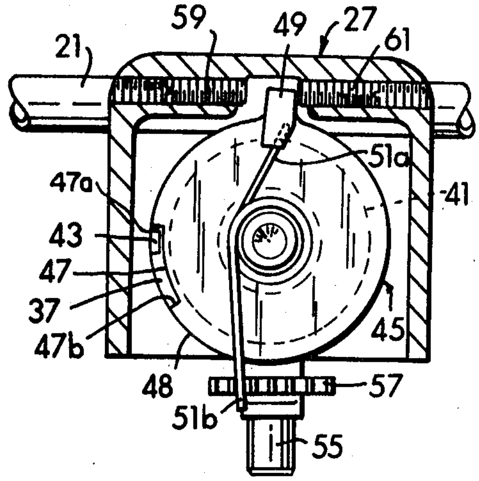
FIG. 7 is a view similar to FIG. 3 showing the tone arm just before it has engaged a record.

When the free end of the tone arm has been raised from the turntable, to its maximum position of elevation, the drag disc 45 will be located in the position represented by FIG. 5. For this condition, assuming that an upward force is still being exerted on the free end of arm 21, the bottom shoulder 47*b* of the cutaway portion 47 of the disc 45 engages the bottom of the stop tab 43 of the stator 31. If the upward force exerted upon the tone arm is then released, in view of action of spring 51, the inner end of the adjusting screw 61 will thereupon commence to act upon the adjacent surface of pickup tab 49. Since the spring 51 has been loaded, it will tend to drive drag disc 45 in a counterclockwise direction (viewing FIG. 6) against the viscous damping fluid disposed in channel 41 of the stator 31, and the free end of the tone arm will slowly drop toward the turntable, in the fashion shown in FIG. 6. Just before the stylus 25 at the free end of the tone arm 21 engages record 17, the mechanism will reach the condition shown in FIG. 7. After the stylus 25 impinges on the record, although stopping the free end of the tone arm will then cause the tone arm to cease rotating in a counterclockwise direction about its horizontal axis, the force of spring 51 continues to move the drag disc 45 for a small distance (equivalent to the gap shown between shoulder 47*a* of the disc and stop tab 43 in FIG. 7), until the disc 45 reaches the same position relative to the stop tab 43 of the stator as that wherein it is shown in FIG. 3. Shoulder 47*a* of the drag disc then engages the stop tab to stop movement of the disc in a counterclockwise direction.

It will now, therefore, be seen that my new and improved viscous damping system provides an efficient structure for slowly dropping the free end of the tone arm toward the turntable (after elevation of the free end of the arm) and yet also achieving a reliable operational disconnection of the mechanism from the tone arm when it is playing a record on the turntable. It will be further understood that the present invention provides a novel and effective structure or pivotally supporting a tone arm with a viscous damping system that is economically constructed to provide the highly desirable feature of preventing damage to the stylus and/or record if the free end of the tone arm is dropped.

While in accordance with the Patent Statutes, I have described what at present is considered to be the preferred embodiment of my invention, it will be obvious to those skilled in the art that various changes and modifications may be made therein without departing from the invention.

What I claim as new and desire to secure by Letters Patent of the United States is:

1. In a sound reproducing device:

a support;

a turntable arranged on said support for carrying a record member;

means for rotating said turntable and said record member;

a stylus-carrying tone arm for reproducing sound from the sound grooves of said record member;

said tone arm having a pivotally supported end;

a bearing element connected to said support and journaled to said end of said tone arm for pivotally supporting rotational movement of said arm about a horizontal axis;

a viscous damping fluid disposed in a channel formed within said element;

a drag element disposed adjacent said bearing element and in continuous frictional engagement with the viscous damping fluid contained in said channel formed within said bearing element;

said drag element being rotatable with respect to said bearing element; and operating means affixed to the supported end of said tone arm for engaging and rotating said drag element relative to said bearing element in response to pivotal movement of said tone arm about its horizontal axis, thereby to damp the rotational movement of said tone arm about its horizontal axis;

said operating means being disconnected from said drag element when said stylus-carrying tone arm is engaged with said record member, thereby to permit free vertical rotation of the arm when it is reproducing sound from the grooves of said record member.

2. The reproducing device of claim 1 including a spring connected to said drag element to rotate said drag element out of engagement with the operating means of the tone arm after said tone arm has been rotated downwardly so that its stylus impinges upon a record.

3. In a sound reproducing device:

a support;

a turntable arranged on said support for carrying a record member;

means for rotating said turntable and said record member;

a stylus-carrying tone arm for reproducing sound from the sound grooves of said record member;

said tone arm having a pivotally supported end;

a bearing element journaled to said end of said tone arm for pivotally supporting rotational movement of said arm about a horizontal axis;

said bearing element having a vertically extensive surface with a recess formed therein;

a viscous damping fluid disposed in said recess;

a drag element rotatably supported on said bearing element and having a vertically extensive surface in continuous frictional engagement with the viscous damping fluid disposed in the recess of said bearing element;

means for limiting movement of said drag element relative to said bearing element; and operating means affixed to the supported end of said tone arm for engaging and rotating said drag element relative to said bearing element in response to pivotal movement of said tone arm about its horizontal axis, thereby to damp the rotational movement of said tone arm about its horizontal axis;

said operating means being disconnected from said drag element when said stylus-carrying tone arm is engaged with said record member, thereby to permit free vertical rotation of the arm when it is reproducing sound from the grooves of said record member.

4. The reproducing device of claim 3 including a spring coupled between said support and said drag element to rotate said drag element out of engagement with the operating means of the tone arm after said tone arm has been rotated downwardly so that its stylus impinges upon a record.

5. The reproducing device of claim 4 wherein said bearing element has a stop located thereon, and said drag element has a cutout section formed thereon, said stop of said bearing element being located in said cutout section of said drag element so that movement of said drag element with respect to said bearing element is limited by engagement of ends of the cutout section with said stop.

6. The reproducing device of claim 4 wherein said bearing element has a disc-shaped portion, and a hub portion disposed on each side of said disc-shaped portion, each of said hub portions being pivotally connected to the supported end of said tone arm.

7. The reproducing device of claim 6 wherein said recess is of annular configuration and situated on one side of the disc-shaped portion of said bearing element, and said drag element is disc-shaped and contains a central aperture for receiving the hub portion located on the same side of said bearing element as said recess so as to be rotatable about said hub portion, said device including fastening means abutting said spring and causing said spring to urge said drag element into continuous frictional engagement with said viscous damping fluid contained in said recess.

8. In a sound reproducing device:

a support;

a turntable arranged on said support for carrying a record member;

means for rotating said turntable and said record member; a stylus-carrying tone arm for reproducing sound from the sound grooves of said record member;

said tone arm having a pivotally supported end;

a first disc-shaped element journaled to said end of said tone arm for pivotally supporting rotational movement of said arm about a horizontal axis;

said first element having a vertically extensive surface with a recess formed therein;

a viscous damping fluid disposed in said recess;

a second disc-shaped element rotatably supported on said first element and having a vertically extensive surface in continuous frictional engagement with the viscous damping fluid disposed in the recess of said first element;

said second element having a radial projection formed thereon;

means for limiting movement of said second element relative to said first element; and a pair of spaced-apart driving surfaces affixed to the supported end of said tone arm;

said radial projection of said second element being located between said driving surfaces and engageable by one or the other of said driving surfaces for rotating said second element relative to said first element in response to pivotal movement of said tone arm about its horizontal axis, thereby to damp the rotational movement of said tone arm about its horizontal axis;

said spaced-apart surfaces being each disengaged from said radial projection when said stylus-carrying tone arm is engaged with said record member, thereby to permit free vertical rotation of the arm when it is reproducing sound from the grooves of said record member.

9. The sound-reproducing device of claim 8 wherein the operating means comprises a pair of opposed adjustable screws mounted on the supported end of the tone arm, and the drag element includes a radially protruding portion disposed between the screws, the inner end of one of said screws being located on the supported end of the tone arm to engage one side of the protruding portion of the drag element for rotation of said drag element in one direction with respect to said bearing element during movement of said tone arm from a position raised substantially above said record member toward a position on said record member, the inner end of the other of said two screws being located on the supported end of the tone arm to engage the other side of the protruding portion of the drag element for rotation of the drag element in an opposite direction with respect to said bearing element during movement of said tone arm from a position on said record member to a position raised substantially above said record member.

10. The sound-reproducing device of claim 8 wherein each of said driving surfaces is adjustably positioned in the supported end of the tone arm.

* * * * *